United States Patent Office 3,405,000
Patented Oct. 8, 1968

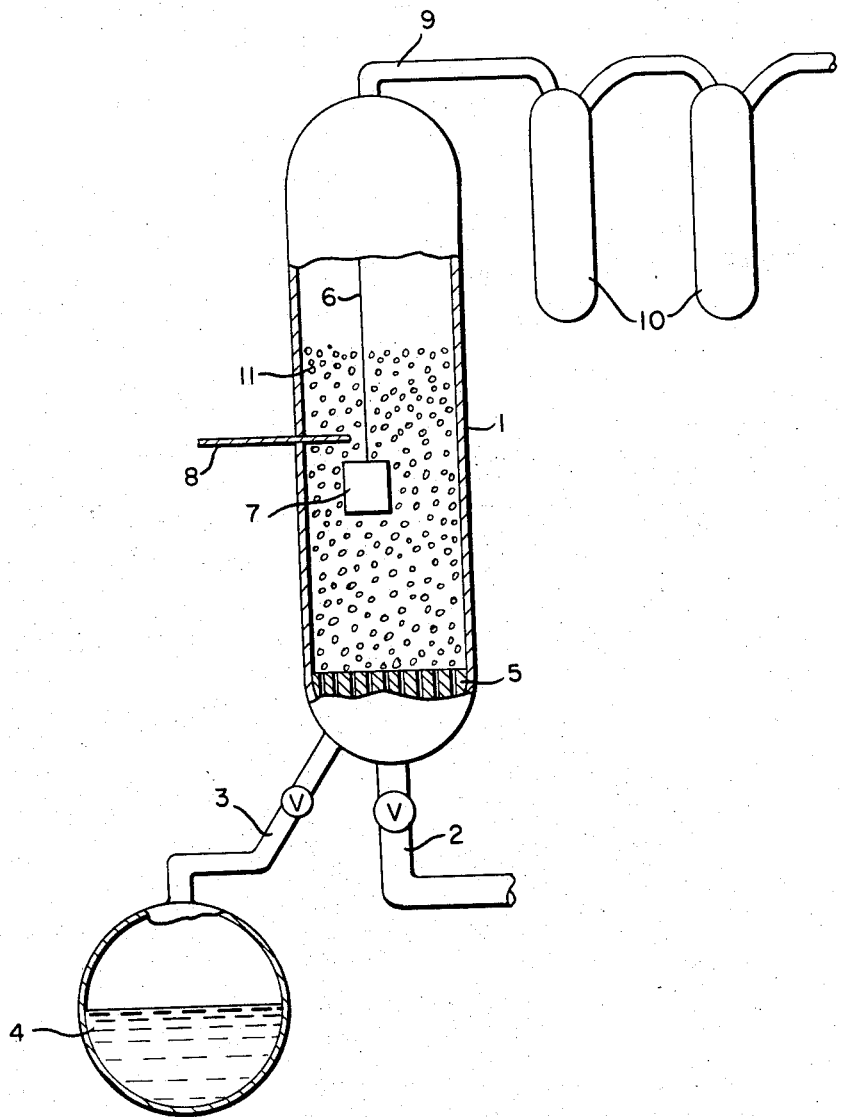

3,405,000
PROCESS FOR COATING METAL ARTICLES
EMPLOYING FLUIDIZED BED
Howard W. Jacobson, Brandywine Hundred, Del., assignor to E. I. du Pont de Nemours and Company, Wilmington, Del., a corporation of Delaware
Filed Oct. 7, 1965, Ser. No. 493,692
5 Claims. (Cl. 117—107.2)

This invention relates to processes for applying protective coatings to metal bodies and to the articles produced, and is more particularly directed to such processes which are effective for applying coatings of uniform thickness to metal bodies of labyrinthine design, the processes comprising heating the article at a temperature in the range of 750 to 1250° C. in a fluidized bed of particles comprising at least one element selected from the group consisting of boron, chromium, hafnium, molybdenum, silicon, titanium, tungsten, and zirconium, the metal in said article consisting essentially of at least one metal selected from the group consisting of columbium, tantalum, molybdenum and alloys in which one of these metals is the major constituent, the fluidized bed being kept in suspension by an upward flow of gas comprising iodine vapor, and the pressure in the fluidized bed being in the range of 40 to 600 mm. of mercury.

In the drawing is shown a cross-sectional view of a fluid bed reactor suitable as means for carrying out a process of the invention.

Among the most useful processes recently developed for forming high temperature corrosion-resistant coatings on metal articles is a method wherein the articles to be coated are suspended in a reactor in contact with a bed of particles of the coating material fluidized by the upward flow of either an inert gas or of a reactant gas, or a reactant gas diluted with an inert gas. This method has proved quite valuable in that relatively large metal pieces can be so coated, and the method can be quite economical to operate, is easy to control, and can be adapted to many different compositions, both as regards metal objects to be coated and the coating materials.

Heretofore it has been customary practice to operate fluidized beds at pressures slightly greater than atmospheric. By this means of operation, it has sometimes been possible to control the process so that a very good yield was obtained on the coating materials and a rapid deposition of coating was possible; but uniformity in the thickness of coating was very often not achieved. This has been particularly true when the objects to be coated were of unusual, or angular, or perforate, design. Articles, herein referred to as being of labyrinthine design, in which there are pores or indentations or other inwardly-disposed irregularities have been especially difficult to coat.

The present invention relates to a process whereby coatings of uniform thickness can be obtained on metal articles, and especially on metal articles of labyrinthine design. It has been found that when the fluidized bed process is operated at subatmospheric pressures, it is possible to obtain a uniform deposition of one or more of several metals, or alloys, on metal objects. The method of the invention results in coatings of very uniform thickness on irregularly shaped objects, even those which are of a porous structure. The coatings which are produced are smooth and adherent. Because of the decreased gas flow required for the operation of the fluidized bed, these coatings are produced at lower cost than has previously been possible.

In the drawing is shown a cross-sectional view of a reactor in which objects may be coated according to the novel processes. A reactor 1, which may be constructed of silica or of any metal resistant to corrosion or oxidation under the conditions of operation, has feed lines 2 and 3 entering at the bottom, through which gases enter the reactor for the purpose of fluidizing the particles therein and supplying reactant materials thereto. One of these inlet lines 3 is connected to an iodine vapor generator 4, which is heated either by a flow of hot inert gas over it, or by an external heating means, not shown, to supply iodine vapor to the fluidized bed as one of the reactants. The gases introduced into the bottom of the reactor pass through a perforated or porous plate 5 which serves to hold the bed in the reactor under non-fluidized condition. Particles of silica or of alumina as an inert material and of at least one elemental metal, metalloid, or compound of metal which will comprise one of the components of the coating make up the bed to be fluidized 11. Suspended within the reactor by means of a corrosion- and oxidation-resistant wire 6 which may conveniently be tantalum metal, are the objects 7 to be coated. A thermocouple 8 within the reactor registers the temperature adjacent the objects being coated. An exit line 9 connects to a vacuum pump through one or more cold traps 10. The entire reactor is enclosed in a heating means, not shown.

In carrying out the process of the invention, a mixture of iodine vapor and inert gas, preferably argon, is introduced at the bottom of the reactor in sufficient volume to fluidize a bed comprising particles of the metals, or alloys to be coated onto the objects suspended within the reactor, and preferably also particles of inert material of the group zirconia, thoria, magnesia, silica or alumina. The coating on the objects can comprise one or more elements which will undergo reactions generally termed as "transport" reactions; that is, the element or compound combines with iodine to form a volatile iodide, which decomposes in contact with the hot metal surface of the object to be coated to form metal (or alloy) and iodine. These thermal decomposition reactions are favored by subatmospheric pressure which is a required condition for the operation of this invention. Iodine is freed to combine with additional metal from the fluidized bed, and the decomposition step is repeated to form a metal coating on the objects suspended in the reactor. Metals or metalloids which can be used in the iodine-transport reactions of the invention are the following: B, Cr, Hf, Mo, Si, Ti, W, and Zr. For convenience these will hereafter be called the coating metals. Compounds which can be used are, for example, tungsten silicides, molybdenum silicides, boron silicides, titanium borides, and zirconium borides. The metal in the objects upon which the metal or alloy coating is deposited can be columbium, tantalum or molybdenum or alloys in which one of these is the major constituent—i.e., comprises more than 50% by weight. Particularly good results have been obtained when the objects to be coated have been of tantalum- or columbium-base alloys.

The temperature at which the process is carried out is determined by the choice of coating material and by the composition of the objects to be coated. The process has been found to be operable at from about 750° C. to about 1250° C. A preferred range of operation is from about 850° to about 1100° C. In this temperature range the iodides of those metals and alloys which have been found most useful as coating materials undergo cracking when in contact with a hot tantalum-base or columbium-base alloy.

In order for the coating of the objects to be uniform, smooth, and the coating material deposited in good yield, the reactor must be operated at subatmospheric pressure. It has been found that satisfactory coatings are deposited when the pressure within the reactor is in the range of 40 to 600 mm. of mercury, preferably about 40 to 100 mm. Hg.

In one preferred embodiment of the invention the fluidized bed comprises (1) a powdered alloy of titanium and chromium in the weight ratio of from 70:30 to 30:70, and (2) particulate silica in the −20−+40 mesh size range. This bed is preferably operated at about 1000° C., using a suspending gas containing equal parts by volume of iodine and argon, at a pressure of about 65 mm. of mercury. This bed is especially useful for coating articles of an alloy of columbium containing, by weight, about 10% titanium and 10% molybdenum.

The method of operation of the invention will be more fully explained by the following examples:

Example 1

A silica reactor of the design shown in the drawing, 2″ in diameter by 30″ in length, was charged with 250 grams of silica of −40−+80 mesh particle size and 200 grams of powdered Ti-Cr alloy of −20−+40 mesh size, the proportions of Ti to Cr in the alloy being 1:1 by weight. This charge of powdered alloy provided a bed depth of 4 to 5″ in the reactor before fluidization.

The metal pieces to be coated were three pieces of a columbium, 10% Mo, 10% Ti alloy tubing of 40 mil wall thickness, each tube 6″ long by ⅛″ diameter and closed at one end. These metal pieces were suspended, open end down, by means of a tantalum wire at a depth in the reactor such that when the particles comprising the bed were fluidized, the objects to be coated were beneath the surface of the fluidized bed. A flow of argon was started to the reactor at a rate sufficient to fluidize the particles within the reactor, and heating of the reactor was begun. The reactor was operated at subatmospheric pressure, a pressure of 65 mm. Hg being maintained within the reactor during this run. When the temperature within the reactor reached 1000° C, the gas feed was changed to 50 vol. percent iodine vapor-50 vol. percent argon, and these operating conditions were maintained over a period of 4 hours.

At the conclusion of this time, heating was discontinued, the flow of iodine vapor was stopped and the reactor was cooled to room temperature while the flow of argon was maintained at sufficient rate to continue fluidizing the bed. The pressure within the reactor was maintained at 65 mm. Hg.

The specimens were removed from the reactor and examined. A uniform, smooth, completely adherent 0.8 mil coating had been deposited on the tubes, this coating being of the same depth on the inside and at the angular portions of the tubes as on the curved and flat surfaces. The composition of the coating was analyzed and found to be 60% by weight Cr and 40% by weight Ti.

Example 2

Following the same operating procedure as is described in Example 1, three metal specimens of columbium-6% Mo-10% Ti-20% W alloy were coated. The metal specimens in this example were in the form of a corrugated foil welded to sheet of the same alloy. The coating reaction was carried out under the same conditions as described in Example 1.

The cooled coated specimens were removed from the reactor, and one of the panels was cut in cross-section for examination of the internal surface of the corrugated foil. It was found that the Ti-Cr alloy coating had been deposited uniformly on the entire specimen, the inside portion of the corrugated foil being as uniformly coated as the exterior portion.

Example 3

The two uncut panels which were prepared in Example 2 were suspended in the reactor above a bed composed of 250 grams silica (−40−+80 mesh size) and 50 grams of substantially pure silicon powder (−20−+40 mesh size). Under reduced pressure (40 mm. Hg) the bed was fluidized, heated to 950° C, and iodine vapor introduced with the argon as is described in Example 1. The reaction was carried out for three hours under these conditions, and the reactor then cooled and the specimens removed.

The specimens thus prepared were subjected to a flow of air at 1240° C. for 80 hours without failure of the specimen due to oxidation, Failure would be indicated by a rapid increase in weight of the specimen, and would be visually evident as well.

I claim:
1. In a process for coating a metallic article the step comprising heating it at a temperature in the range of 750 to 1250° C. in a fluidized bed of particles comprising at least one element selected from the group consisting of boron, chromium, hafnium, molybdenum, silicon, titanium, tungsten, and zirconium, the metal in said article consisting essentially of at least one metal selected from the group consisting of columbium, tantalum, molybdenum and alloys in which one of these metals is the major constituent, the fluidized bed being kept in suspension by an upward flow of gas comprising iodine vapor, and the pressure in the fluidized bed being in the range of 40 to 600 mm. of mercury.

2. In a process for coating a metallic article the step comprising heating it at a temperature in the range of 750 to 1250° C. in a fluidized bed comprising (1) at least one element selected from the group consisting of boron, chromium, hafnium, molybdenum, silicon, titanium, tungsten and zirconium and (2) inert particles selected from the group consisting of zirconia, thoria, magnesia, silica and alumina, the metal in said article consisting essentially of at least one metal selected from the group consisting of columbium, tantalum, molybdenum, and alloys in which one of these metals is the major constituent, the fluidized bed being kept in suspension by an upward flow of gas comprising iodine vapor, and the pressure in the fluidized bed being in the range of 40 to 600 mm. of mercury.

3. A process of claim 2 wherein the article coated is of labyrinthine design.

4. In a process for coating a metal article of labyrinthine design the step comprising heating it at a temperature of about 1000° C. in a fluidized bed comprising (1) a powdered alloy consisting of titanium and chromium in the weight ratio of from 70:30 to 30:70 and (2) particulate silica in the −20−+40 mesh size range, the metal in said article consisting of an alloy of columbium containing, by weight, about 10% of molybdenum and 10% titanium, the fluidized bed being kept in suspension by an upward flow of a gas containing, by volume, about 50% of argon and 50% iodine vapor, and the pressure in the fluidized bed being about 65 mm. of mercury.

5. An article coated by a process of claim 1.

References Cited

UNITED STATES PATENTS

| | | | |
|---|---|---|---|
| 2,978,316 | 4/1961 | Weir | 117 |
| 3,178,308 | 4/1965 | Oxley | 117—106 |
| 3,202,537 | 8/1965 | Norman et al. | 117—100 |
| 3,249,462 | 5/1966 | Jung et al. | 117—71 |

ALFRED L. LEAVITT, Primary Examiner.

A. GOLIAN, Assistant Examiner.